United States Patent Office 2,767,004
Patented Oct. 16, 1956

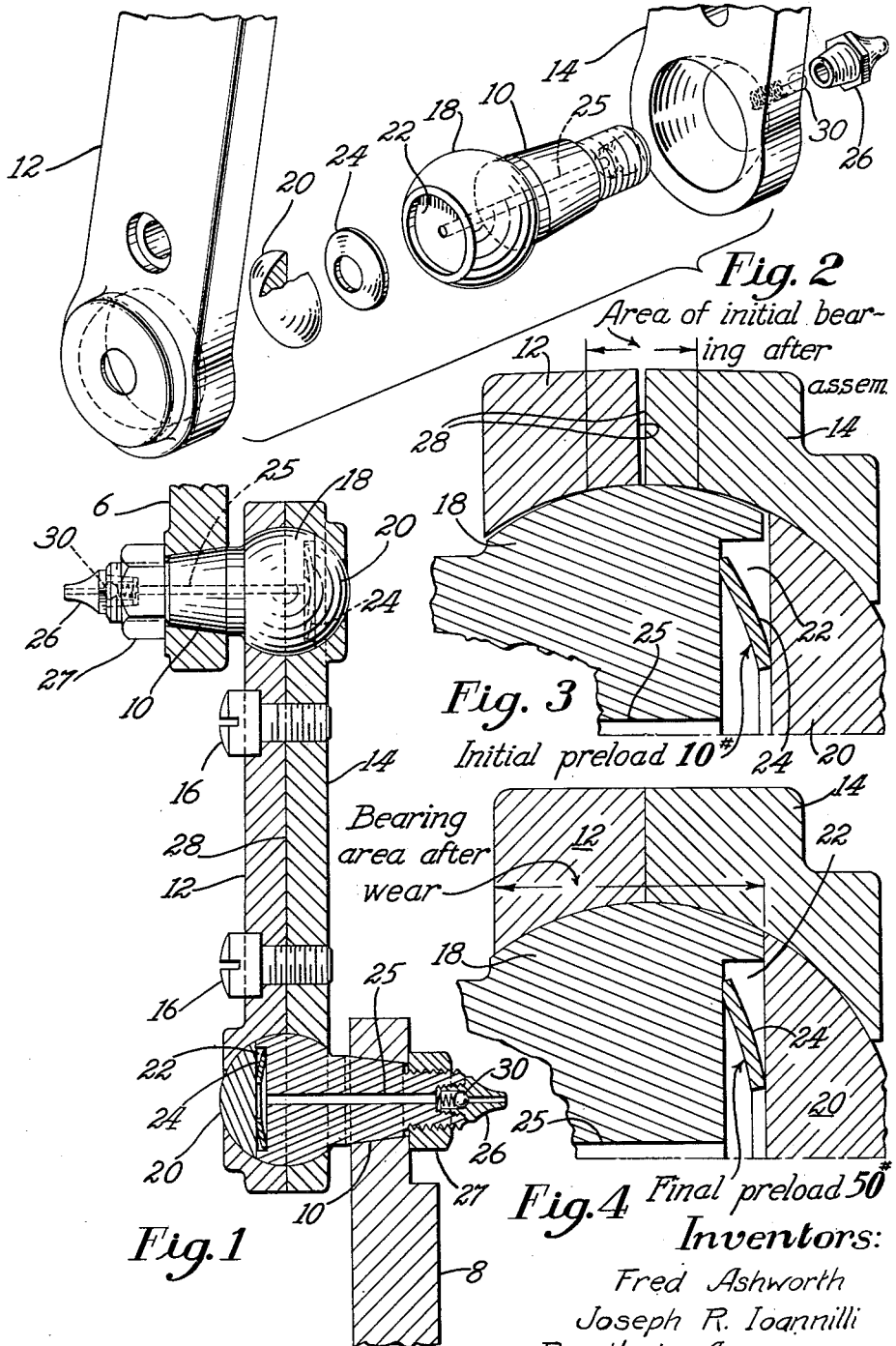

2,767,004

PRELOADED BALL JOINTED LINKS

Fred Ashworth, Wenham, and Joseph R. Ioannilli, Beverly, Mass., assignors to United Shoe Machinery Corporation, Flemington, N. J., a corporation of New Jersey Application April 20, 1953, Serial No. 349,872

6 Claims. (Cl. 287—89)

The present invention relates to improvement in light weight preloaded, precision fitted, ball joints for link connections, and more particularly to a novel form of two-part link having ball-headed studs projecting at opposite ends and in opposite directions from the link, in which there is great durability under unusually destructive conditions of high-speed and high-stress operation.

It is a purpose of the invention to provide a two-part link combined with oppositely projecting ball-headed connection studs, which will employ a simple readily manufactured construction conveniently suscepticle to mass production procedures without detracting from durability and accuracy in fit between the parts under conditions of high-speed operation and high-intensity loads. While the greatest benefits are obtained from the invention when applied to a two-part link provided with ball-headed studs projecting in opposite directions from its ends, the invention also is of advantage when employed with a single part link having separate socket plates secured to its sides co-operating with the link to retain the ball heads of the studs in predetermined relationship to the link, either with the studs projecting in opposite directions from the link or in the same direction. Under some circumstances the studs may project from the link in a relationship other than parallel, the link itself in this case being twisted about its lengthwise axis to enable the sockets for retaining the ball heads of the studs to be located in an angular relationship to each other.

The features of the invention as hereinafter described and claimed will readily be apparent to those skilled in the art from the following detail description and accompanying drawings in which:

Fig. 1 is a sectional view on an enlarged scale of a ball-jointed link embodying the features of the present invention;

Fig. 2 is a separated perspective view of the parts of a ball joint at one end of the link illustrated in Fig. 1;

Fig. 3 is a further enlarged detail sectional view illustrating the operation of the ball joint shown in Fig. 2 when newly manufactured; and Fig. 4 is a similar view showing the condition of the parts after being well worn.

The illustrated ball-jointed link is of the preloaded type intended for operation in a high-speed machine where lightness of the weight and stresses to which the parts are subject prevent the use of an ordinary link pivotally connected to its driving and driven members by conventional forms of cylindrical pin and journal bearings. Due to the limitations in weight and to the high stresses imposed on the parts, the illustrated link and its cooperating members are subject to excessive distortion. The distortion frequently is so greatly that the conventional pin and journal bearings would be destroyed within a short period of operation even with simple single plane movements. To increase the life of the connections between the link parts and its cooperating members, the illustrated link is connected to its members by ball points of novel construction having special advantages in easy manufacturing procedures and satisfactory durability without rapid development of excessive looseness in use. In fact, the joints connecting the illustrated link with its cooperating members act automatically to induce a greater preload during a substantial part of their lives than existed at the time of original assembly, the parts also fitting more closely together over greater bearing areas than the parts of prior ball-jointed links without any corresponding development of looseness or free play as wearing in occurs.

Referring more particularly to the drawings, the ball-jointed link illustrated forms a connection between one arm of an operating lever 6 and a reciprocating bar 8, in a high-speed shoe sewing machine, the lever swinging in an arc, the plane of which is parallel to the line of movement of the bar 8. A machine of the type employing the illustrated ball-jointed link is disclosed in United States Letters Patent No. 2,737,134, granted March 6, 1956, in the names of the present inventors. In the machine of that patent the bar 8 has connected to it at one end a straight hook sewing needle for operating upon heavy leather, wood or other similar penetration-resisting substances of a thickness of one inch or more. The machine is capable of operating at a maximum rate of 700 stitches per minute. Under these conditions a minimum weight of the operating parts and a maximum ultimate tensile strength are essential, the parts being constructed of hardened alloy steels, and being capable of operating within their elastic limits under conditions of relatively large intensities of distortion without causing excessive frictional effects from irregular pressures between the parts as a result of distortion.

The joints connecting the operating lever 6 and the reciprocating bar 8 have threaded ball-headed studs 10 clamped in substantially parallel relationship, respectively, in the lever and bar, and the ball heads are received in sockets in the link. The link itself comprises a pair of flat-sided plates 12 and 14 of appreciable though relatively stiff inherent resiliency, both plates providing equally spaced hemispherical recesses at their ends and being held together under a clamping pressure with their opposed recessed faces in contact with each other within a plane substantially at right angles to the lengths of the studs. The outer rims of the recesses outline great circles of the recesses. To hold the recessed faces of the plates in contact, clamping means is provided consisting of a pair of cap screws 16 passing through close-fitting openings in the plate 12 and into threaded relation with openings in the plate 14. To increase the strength of the connection between the plates and to prevent relative slippage along their contacting faces, the plate 12 is counterbored to form a close-fitting engagement with a cylindrical surface closely surrounding the heads of the screws 16 which are of a fillister form.

In order to induce a primary preload in the joints between the link 8, 10 and the ball heads of the studs, each ball head is divided into conjugate spherical segments 18 and 20 of substantially unequal altitudes, the major segment 18 of which comprises a ball head greater than a hemisphere secured to its stud. The minor segment 20 is in the form of a spherical cap, less than a hemisphere and conjugate to the segment 18. The two segments 18 and 20 when brought into contact constitute a complete sphere except for the surface from which the stud projects. The recesses of the plates are carefully fitted to the ball to insure a tight joint, the great circles of the recesses being of slightly smaller diameter than that of the major segment 18. With proper preload the ends of the plates are spread by the major ball segments 18 to transmit the clamping pressure of the screws 16 only to the extent in which the stiffness of the plates is limited by their inherent resiliency.

The studs 10 project in opposite directions from the link, providing better adaptability to machine construction and more convenient accessibility in use than when both extend from the same side of the link, especially for a short link. With the use of a socket of smaller diameter than that of the major ball segment 18 a secure preloaded joint is provided even after substantial wear.

To afford greater smoothness of operation, durability and longer continuity of preload than heretofore possible, according to the present invention, each pair of spherical segments 18 and 20 have interposed between them a relatively stiff secondary preloading spring in the form of a dished washer or disk 24. On the base surface of the major segment 18 is a circular indentation 22 forming a seat for the dished washer 24. The washer 24 has a perforation, the inner edge of which engages the central base area of the spherical cap 20, and a circular margin, the outer edge of which engages a flat seat within the indentation 22 of the major segment 18. The circular indentation is bounded by a confining shoulder on the segment. The spring washer 24 presses the cap in a direction to separate it from the major segment 18, forcing it against one of the plates 12 or 14 and reducing lost motion existing between the parts. The rim of the washer resting throughout its periphery on the ball head and the central area engaging the cap, maintains the cap against substantial tilting movement with relation to its ball head. The force of the washer is sufficient to reduce lost motion between the plates and the spherical segment 18 to a point where excessive wear and noise from impact are avoided even when a maximum stress is applied to the parts under full speed machine loads, so long as the extent of lost motion does not exceed one thousandth of an inch between each ball and its co-operating socket. For best results the washer 24 is constructed to exert a force with a resilient action of less intensity than that exerted by the link plates 12 and 14 against the segments.

However, the plates are held spread apart slightly at their ends by reason of the major segment 18, the inherent resiliency of the plates permitting separation. When use produces lost motion in a joint to an extent exceeding one thousandth of an inch loud destructive impacts and rapid wear occur. The preloading spring disk 24 does not affect the tightness of the joint after initial assembly, exerting a force of less intensity than that required to spread the plates 12 and 14, but it does add greatly to the smoothness of movement between each ball and the link.

A dished washer preloading spring is extremely effective for short yielding movements. It has the disadvantage, however, that if compressed to a flattened condition it is likely to lose its resiliency or to be reversed in its position with relation to its inner and outer edges. Thus, if the washer 24 were reversed between the cap 20 and the major segment 18, instead of engaging the cap with its inner edge and the seat in the major segment with its outer edge, the inner edge of the washer would engage the major segment and the outer edge would engage the cap. To prevent reversal of the dished washer the confining shoulder surrounding indentation 22 is made substantially thicker than the washer so that the compressing movement is limited.

The dimensions of the parts in the ball joints at the ends of the link together with the construction indicated afford an opportunity for manufacture with normal precision methods without loss of a large proportion of parts by reason of tolerances greater than can be taken up by resiliency of the plates or other preloading. Joints embodying the features of the present invention have an unusual durability for their size, at least as great as other moving parts in a high-speed machine of normal construction and are subject to convenient mass production by commonly available grinding machines and by present day machine shop usages within a practical range of useful dimensions and permissible tolerances. Furthermore, the indentations 22 in the ball joints furnish convenient space for retaining individual supplies of lubricating grease and, by drilling the studs axially at 25 to form a passageway entering into the indentation 22 and threading into the ends of the passageway grease fittings 26, the grease is supplied at spaces between the segments where abrasive particles resulting from wear in the parts are forced outwardly from the joints and eventually discharged as fresh supplies are introduced.

The passageways 25 entering the indentations terminate in the space between the segments so that when grease is injected it is retained by the minor segments or caps 20 from loss through the corresponding openings in the links. The construction thus provides a beneficial self-cleansing action.

As a convenient means for clamping the studs against relative movement in the lever 6 and bar 8, the central portion of each stud 10 is tapered to fit snugly within a corresponding opening in the lever or bar, a clamping nut 27 acting to draw the tapered portion into the opening until securement is obtained. Since any possible movement of the spherical segments 18 in the sockets of the links is substantially in a single plane, at right angles to the studs and parallel to the link, the tendency for angular movement of the link laterally relatively to the studs will be reduced to a minimum.

The altitude of the spherical segment 18 in each ball joint is sufficient to provide a spherical surface greater than a hemisphere engaging both plates 12 and 14, so that forces will be transmitted to or from both equally, there being no force aside from preloading pressures transferred from the studs 10 to the segmental caps 20. For a one-half inch ball joint, a dished washer composed of sheet steel stock, five thousandths (0.005") of an inch in thickness is effective to produce the desired resilient action. For other sizes of ball joints other thicknesses of washers are proportioned to obtain the action indicated.

In accordance with present day machine shop practices, it is possible to grind the surface of a spherical ball and socket within a maximum tolerance accuracy of less than five ten-thousandths (0.0005") of an inch. Accordingly, assuming the ball portions of the joints including both segments 18 and 20 to be of a half-inch diameter and to be ground to a size of one-half (0.5000") of an inch with an allowable tolerance of five ten-thousandths (0.0005") of an inch and the spherical socket for each ball has a dimension of one-half (0.5000") of an inch plus five ten-thousandths (0.0005") of an inch tolerance effective results with the construction of the present invention will be obtained. Equal spacing of the recesses in the links is obtained by clamping the plates 12 and 14 together before grinding the recesses. Within these specifications the majority of joints manufactured will have an average clearance of five ten-thousandths (0.0005") of an inch. Even if the clearance between a ball and a socket occasionally exceeds this amount of clearance it is possible to select balls to conform with unusually large or small sockets so that very few parts are rejected for excessive tolerances and efficient usage of materials and workmanship are thus obtained.

An effective initial clearance after grinding of five ten-thousandths (0.0005") of an inch between a ball and a socket with a ball of one-half inch diameter, results in a fit between them requiring the exertion of a heavy force during insertion of a ball within each hemispherical recess of a socket, the outer circumference of each major spherical segment being pressed into close fitting contact with the rims of the spherical recesses in the socket, along an area adjacent to the faces of the plates 12 and 14, as indicated at 28. The effect of the dimensions and tolerances indicated is to render the recesses actually smaller than the ball which they enclose to the extent of several ten thousandths of an inch. The clamp screws 16 are spaced along the links a short distance from the sockets so that the pressure required in forcing the recesses over the major ball segments tends during assembly to cause the plates 12 and 14 to spread apart slightly by reason of their inherent resiliency as illustrated in Fig. 3. The area of initial bearing after assembly thus will be confined to narrow bands surrounding each ball for a short distance from the contacting faces 28. To compensate for the spreading of the faces 28, each cap 20 separates from its spherical segment 18 by a gap of corresponding width, as shown in Fig. 3. When separated to this extent each dished washer 24 exerts a pressure of much less intensity than would be exerted if the base of the cap 20 were brought into full contact with the retaining shoulder on the segment 18. Thus, the initial pressure of the spring washer may be 10 pounds, but a substantially greater pressure is exerted by the links themselves on the segment 18 as a result of being spread slightly a distance possibly in the neighborhood of five ten-thousandths (0.0005") of an inch at the extreme ends of the link. Under these conditions an extremely tight and lost-motion-free joint is obtained. A joint of this construction may have its bearing surfaces initially run in with adequate lubrication and cooling until it is sufficiently free from danger of overheating for acceptable machine operation. Thereafter, there will be only a slight heating action as a result of the preloading pressure until the extent of lost motion greater than one-thousandth of an inch is reached. Since the driving force applied by the lever 6 to the joints is exerted at right angles to areas of initial bearing contact between the balls and the sockets, the greatest efficiency for lost-motion-free action is insured.

The effects of wear after considerable usage are illustrated in Fig. 4 where the primary preload or spread between the contacting faces 28 of the plates 12 and 14 is entirely eliminated, the bearing surfaces of the major segment 18 and the sockets in their entireties being then effective for transmission of force to the enclosed ball. After wear has eliminated the spread of the plates 12 and 14 at their ends the gap between the cap 20 and the major ball segment 18 will close up imparting to the preloading spring washer 24 a greater pressure or secondary preload than after initial assembly. Thus, the spring washer illustrated in Fig. 4 may be compressed with a preloading pressure of 50 pounds in place of its initial pressure of 10 pounds. The increased pressure accordingly will be more effective in reducing lost motion and maintaining the joints within workable limits for a substantial period of time even after the condition of Fig. 4 has been reached. Furthermore, with the parts in the condition of Fig. 4, the bearing surfaces will have become well polished by wear and free from original grinding or other manufacturing irregularities so that good durability of the joints is still insured for an unusual period of time.

The position of the dished spring washer 24 is of importance since it brings the outer edge of the washer into an angle between the confining shoulder and the base of the indentation 22 in the spherical segment 18 where any motion of the washer tending to displace it will be prevented by the shoulder. The portions of the washer surrounding its central perforation which engage the spherical cap 20 act on the cap near its central axis and so exert pressure which will be distributed evenly through the spherical surface of the cap against the corresponding engaging surfaces of the socket. Thus, greater durability and more even distribution of pressure on the parts are obtained than is possible with the position of the washer reversed.

In renewing the supplies of grease in the indentations of the joints, especially after the joints have become well worn from wear, the pressure of the grease within the indentations tends to open up the gap temporarily between the caps and the ball segments 18 in the joints, facilitating the passage of grease between the bearing surfaces of the link and the major spherical segments 18. In opening up the gap between a cap 20 and a segment 18, the plates 12 and 14 are again slightly flexed apart to accommodate the grease between them and the segment 18. This flexure of the plates, however, is obviously temporary and the inherent resiliency of the plates maintains the grease under pressure until it has been worked thoroughly into the joint. In this way an adequate lubrication is insured with no possibility of back pressure as a result of reverse movement in the grease through the passageway 25, each fitting 26 being provided with a spring loaded ball check valve 30 of conventional construction. Also, as grease is forced out from between the segment 18 and the cap the gap between them closes, reducing still further any possible return of old grease containing abrasive particles of metal worn from the parts.

The nature and scope of the invention having been indicated and a particular embodiment having been described, what is claimed is:

1. A preloaded ball-jointed link device comprising a pair of conjugate spherical segments of substantially unequal altitudes, a major one of which is greater than a hemisphere and has secured to it a projecting stud and a minor one of which is less than a hemisphere and is in the form of a cap, said segments when brought together constituting a substantially complete sphere except for the surface from which the stud projects, a spherical socket enclosing both segments comprising a pair of plates constituting the link, having inherent resiliency and being formed with spaced hemispherical recesses in opposed faces, the outer rims of which recesses outline great circles of the recesses and are of smaller diameter than that of the major segment, and means for exerting a primary preloading clamping pressure against the segments in a direction to bring them together and sufficient to hold the plates in contact except for a slight spread at their ends produced by the major segment, in combination with a secondary preloading spring interposed between the spherical segments and constructed to exert a force in a direction to separate the segments but with less intensity than the pressure transmitted by the inherent resiliency of the plates.

2. A preloaded ball-jointed link device comprising a pair of conjugate spherical segments of substantially unequal altitudes, a major one of which is greater than a hemisphere and has secured to it a projecting stud and a minor one of which is less than a hemisphere and is in the form of a cap, said segments when brought together constituting a substantially complete sphere except for the surface from which the stud projects, a spherical socket enclosing both segments comprising a pair of plates constituting the link, having inherent resiliency and being formed with spaced hemispherical recesses in opposed faces, the outer rims of which recesses outline great circles of the recesses and are of smaller diameter than that of the major segment, and means for exerting a primary preloading clamping pressure against the segments in a direction to bring them together and sufficient to hold the plates in contact except for a slight spread at their ends produced by the major segment, in combination with a preloading spring interposed between the spherical segments and constructed to exert a force in a direction to separate the segments but with less intensity than that transmitted by the inherent resiliency of the plates, said major segment having a circular indentation forming a seat for the preloading spring.

3. A preloaded ball-jointed link device comprising a pair of conjugate spherical segments of substantially unequal altitudes, a major one of which is greater than a hemisphere and has secured to it a projecting stud and a minor one of which is less than a hemisphere and is in the form of a cap, said segments when brought together constituting a substantially complete sphere except for the surface from which the stud projects, a spherical socket enclosing both segments comprising a pair of plates constituting the link, having inherent resiliency and being formed with spaced hemispherical recesses in opposed faces, the outer rims of which recesses outline great circles of the recesses and are of smaller diameter than that of the major segment, and means for exerting a primary preloading clamping pressure against the segments in a direction to bring them together and sufficient to hold the plates in contact except for a slight spread at their ends produced by the major segment, in combination with a secondary preloading spring interposed between the spherical segments and constructed to exert a force in a direction to separate the segments but of less intensity than that transmitted by the inherent resiliency of the plates, said major segment having a circular indentation forming a seat for the preloading spring, and the spring comprising a dished washer, the outer edge of which engages the seat within the indentation of the major segment and the outer edge of the seat providing a confining shoulder bounding the circular indentation to prevent displacement of the washer from the indentation.

4. A preloaded ball-jointed link device comprising a pair of conjugate spherical segments of substantially unequal altitudes, a major one of which is greater than a hemisphere and has secured to it a projecting stud and a minor one of which is less than a hemisphere and is in the form of a cap, said segments when brought together constituting a substantially complete sphere except for the surface from which the stud projects, a spherical socket enclosing both segments comprising a pair of plates constituting the link, having inherent resiliency and being formed with spaced hemispherical recesses in opposed faces, the outer rims of which recesses outline great circles of the recesses and are of smaller diameter than that of the major segment, and means for exerting a primary preloading clamping pressure against the segments in a direction to bring them together and sufficient to hold the plates in contact except for a slight spread at their ends produced by the major segment, in combination with a preloading spring interposed between the spherical segments and constructed to exert a force in a direction to separate the segments but of less intensity than that transmitted by the inherent resiliency of the plates, said major segment having a circular indentation forming a seat for the preloading spring, the preloading spring comprising a dished washer having a perforation, the inner edge of which engages a central area on the cap and the circular margin about the outer edge of which engages the seat within the indentation to maintain the cap against substantial tilting movement with relation to the major segment.

5. A preloaded ball-jointed link device comprising a pair of conjugate spherical segments of substantially unequal altitudes, a major one of which is greater than a hemisphere and has secured to its a projecting stud and a minor one of which is less than a hemisphere and is in the form of a cap, said segments when brought together constituting a substantially complete sphere except for the surface from which the stud projects, a spherical socket enclosing both segments comprising a pair of plates constituting the link, having inherent resiliency and being formed with spaced hemispherical recesses in opposed faces, the outer rims of which recesses outline great circles of the recesses and are of smaller diameter than that of the major segment, and means for exerting a primary preloading clamping pressure against the segments in a direction to bring them together and sufficient to hold the plates in contact except for a slight spread at their ends produced by the major segment, in combination with a preloading spring interposed between the spherical segments and constructed to exert a force in a direction to separate the segments but with less intensity than that transmitted by the inherent resiliency of the plates, said major segment having a circular indentation forming a seat for the preloading spring, the preloading spring comprising a dished washer engaging the cap and the major segment, the circular indentation being bounded by a washer confining shoulder for limiting the compression of the washer to prevent reversing the engagement of its inner and outer edges with relation to the cap and the major segment.

6. A preloaded ball-jointed link device comprising a pair of conjugate spherical segments of substantially unequal altitudes, a major one of which is greater than a hemisphere and has secured to it a projecting stud and a minor one of which is less than a hemisphere and is in the form of a cap, said segments when brought together constituting a substantially complete sphere except for the surface from which the stud projects, a spherical socket enclosing both segments comprising a pair of plates constituting the link, having inherent resiliency and being formed with spaced hemispherical recesses in opposed faces, the outer rims of which recesses outline great circles of the recesses and are of smaller diameter than that of the major segment, and means for exerting a primary preloading clamping pressure against the segments in a direction to bring them together and sufficient to hold the plates in contact except for a slight spread at their ends produced by the major segment, in combination with a preloading spring interposed between the spherical segments and constructed to exert a force in a direction to separate the segments, said major segment having a circular indentation forming the seat for the preloading spring, one of said segments being drilled to form a passageway entering into the spring receiving indentation and a fitting in the passageway for supplying grease within the indentation.

References Cited in the file of this patent

UNITED STATES PATENTS

| 174,990 | Webber | Mar. 21, 1876 |
| 1,499,298 | Eller | June 24, 1924 |
| 1,829,305 | Sneed | Oct. 27, 1931 |
| 2,265,839 | Hufferd et al. | Dec. 9, 1941 |
| 2,528,221 | Flumerfelt | Oct. 31, 1950 |
| 2,652,221 | Kampa | Sept. 15, 1953 |

FOREIGN PATENTS

| 465,265 | Canada | May 23, 1950 |
| 852,022 | Germany | Oct. 9, 1952 |
| 866,578 | Germany | Feb. 12, 1953 |